Sept. 22, 1959  A. K. VEITH  2,904,936
MACHINE TOOL ADJUSTING STRUCTURE
Filed Oct. 4, 1955  5 Sheets-Sheet 1

INVENTOR:
Alfred Konrad Veith
by Michael S. Striker
Agt.

United States Patent Office 2,904,936
Patented Sept. 22, 1959

2,904,936

MACHINE TOOL ADJUSTING STRUCTURE

Alfred K. Veith, Ohringen, Wurttemberg, Germany

Application October 4, 1955, Serial No. 538,456

Claims priority, application Germany October 26, 1954

6 Claims. (Cl. 51—103)

The present invention relates to machine tools and more particularly to an adjusting structure for machine tools.

In conventional machine tools the same adjusting structure is used for roughly adjusting the tool of the machine tool as well as for precisely adjusting this tool, and it is very difficult to provide an accurate tool adjustment with a conventional structure of this type.

One of the objects of the present invention is to provide a machine tool with separate adjusting structures one of which is capable of roughly adjusting a tool while the other is capable of very precisely adjusting the tool.

Another object of the present invention is to provide a fine adjusting structure which is capable of providing an extremely precise adjustment with a relatively large movement of the fine adjusting member which is actuated by the operator.

A further object of the present invention is to provide a machine tool with a fine adjustment carriage which is capable of moving without any play.

An additional object of the present invention is to provide a machine tool with a coarse and a fine adjusting structure both of which are capable of being conveniently and quickly operated.

Also, it is an object of the present invention to provide a structure capable of accomplishing all of the above objects and at the same time composed of simple and ruggedly constructed elements which are very reliable in operation.

With the above objects in view the present invention mainly consists of a machine tool which includes a first carriage and a supporting means supporting this first carriage for movement along a first path. A second carriage carried by the first carriage for movement with respect to the first carriage is also movable along a path which is substantially parallel to the first path. A coarse adjusting means is operatively connected to one of these carriages for roughly adjusting the position of this one carriage along its path of movement, and a fine adjusting means is operatively connected to the other of the carriages for very precisely adjusting the position of this other carriage along its path of movement, so that a tool carried by the second carriage may have its operating position roughly determined by the coarse adjusting means and then very precisely determined by the fine adjusting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The drawings illustrate the principle of the present invention as applied to a grinding machine such as, for example, a centerless grinding machine, but it is to be understood that the principle of the present invention is equally applicable to any machine tool which carries a tool which must be very precisely adjusted.

Figure 1:
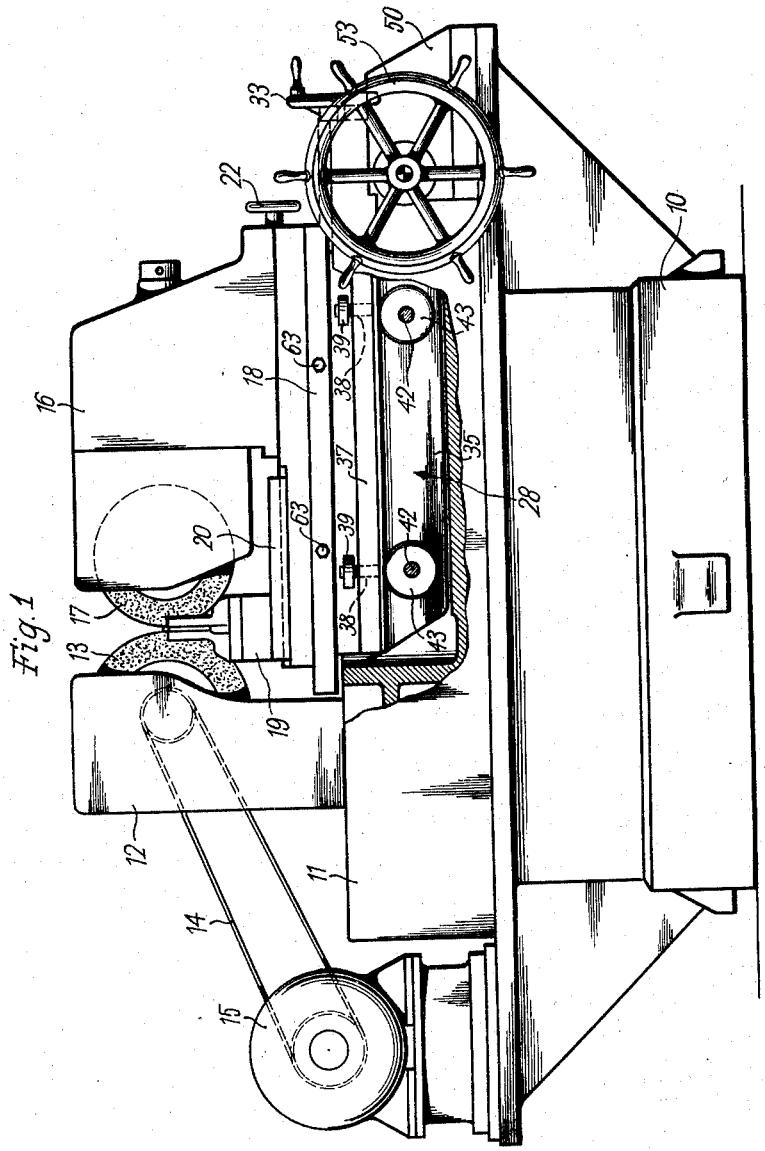
Fig. 1 is a partly broken away partly sectional side elevational view of a grinding machine which is constructed according to the present invention.
Figure 2:
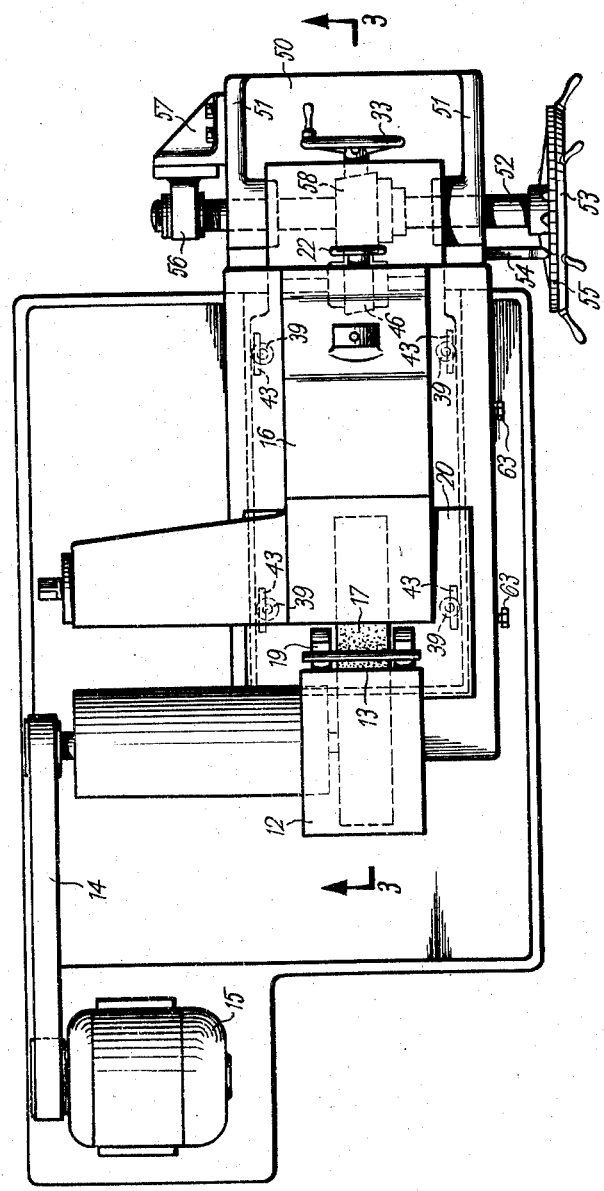
Fig. 2 is a plan view of the machine of Fig. 1.

Referring now to the drawings and to Fig. 1 in particular, it will be seen that the machine tool of the invention includes a support means in the form of a frame bed 10 which fixedly carries a rigid support portion 11. A rigid member 12 is rigidly fixed to the support portion 11 and rotatably supports a grinding wheel 13 whose axis of rotation remains stationary during operation of the machine. The grinding wheel 13 is rotated by a belt 14 which is driven by a pulley operatively connected to a motor 15 carried by the bed 10, so that the motor 15 drives the grinding wheel 13 by the belt 14. Another grinding wheel 17 is supported for rotation by a rigid member 16 which is fixed to a rough adjustment carriage 18, as is shown most clearly in Fig. 3. However, if desired, the member 16 may be adjustably carried by the carriage 18 for movement to the left and right, as viewed in Fig. 3, and any suitable rough adjusting means may be connected to the carriage 16 for adjusting the latter on the carriage 18 with the latter type of construction. In the example shown in the instant application the member 16 is rigid with the rough adjustment carriage 18. This rough adjustment carriage further carries a relatively small carriage 20 which is guided by suitable guides of the carriage 18 for movement to the right and left, as viewed in Fig. 3, and this carriage 20 fixedly carries a block 19. As is apparent particularly from Fig. 2, the block 19 is substantially U-shaped and has a pair of upwardly extending legs defining between themselves a space into which the grinding wheels 13 and 17 extend, as shown in Fig. 2. These upwardly extending legs of the block 19 may carry a rod which supports a work piece to be ground by the wheels 13 and 17.

The carriage 18 turnably supports a spindle 23 provided with a handle 22 so that the spindle 23 may be turned by the operator. The hub 24 of the handle 22 which is fixed to the spindle 23 engages an end face of the carriage 18, and a collar 25 is fixed to the spindle 23 and also engages part of the carriage 18 so that the spindle 23 is restrained against axial movement but can rotate freely about its axis. The threaded portion of the spindle 23 extends through a threaded bore of a nut portion 21 fixed to the carriage 20, so that when the operator turns the handle 22 the position of the carriage 20 with respect to the carriage 18 may be adjusted.

Figure 5:
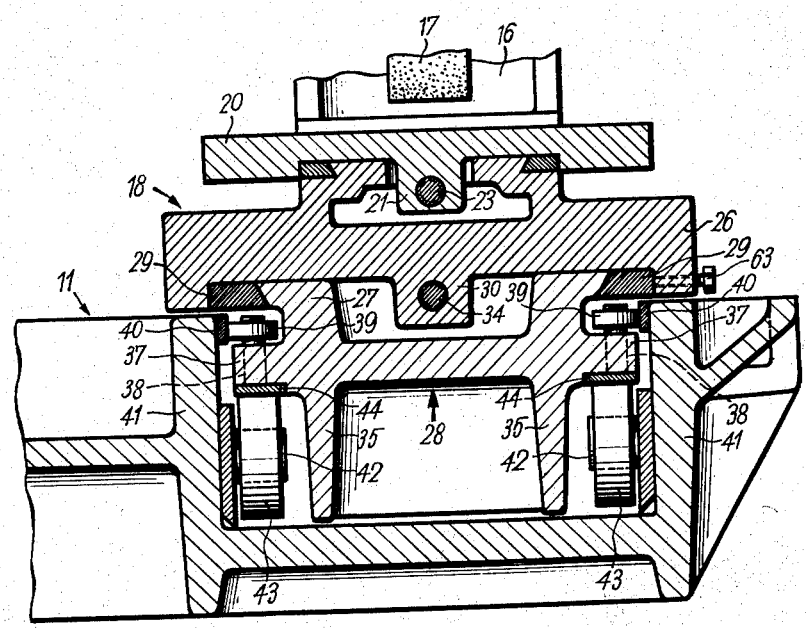
Fig. 5 is a fragmentary sectional elevational view taken along line 5—5 of Fig. 3 in the direction of the arrows.

As is apparent particularly from Fig. 5, the carriage 18 is of a substantially U-shaped cross section and forms a cover plate 26 for covering part of the space formed by the support 10, 11. Thus, as is apparent from Fig. 5, the carriage 18 has a pair of downwardly extending side flanges which extend longitudinally along the length of carriage 18 in a direction parallel to the path along which the carriage 18 moves. The under surface of the carriage 18 rests on the top surface portions of a pair of elongated ribs 27 integral with and extending longitudinally along a fine adjustment carriage 28. The elongated ribs 27 fixedly carry a pair of guide strips 29 which engage the inner surfaces of the side flanges of the carriage 18 as well as part of the under surface of carriage 18 so that these guide strips precisely guide the carriage 18 for movement back and forth with respect to the fine adjustment carriage 28.

Figure 3:
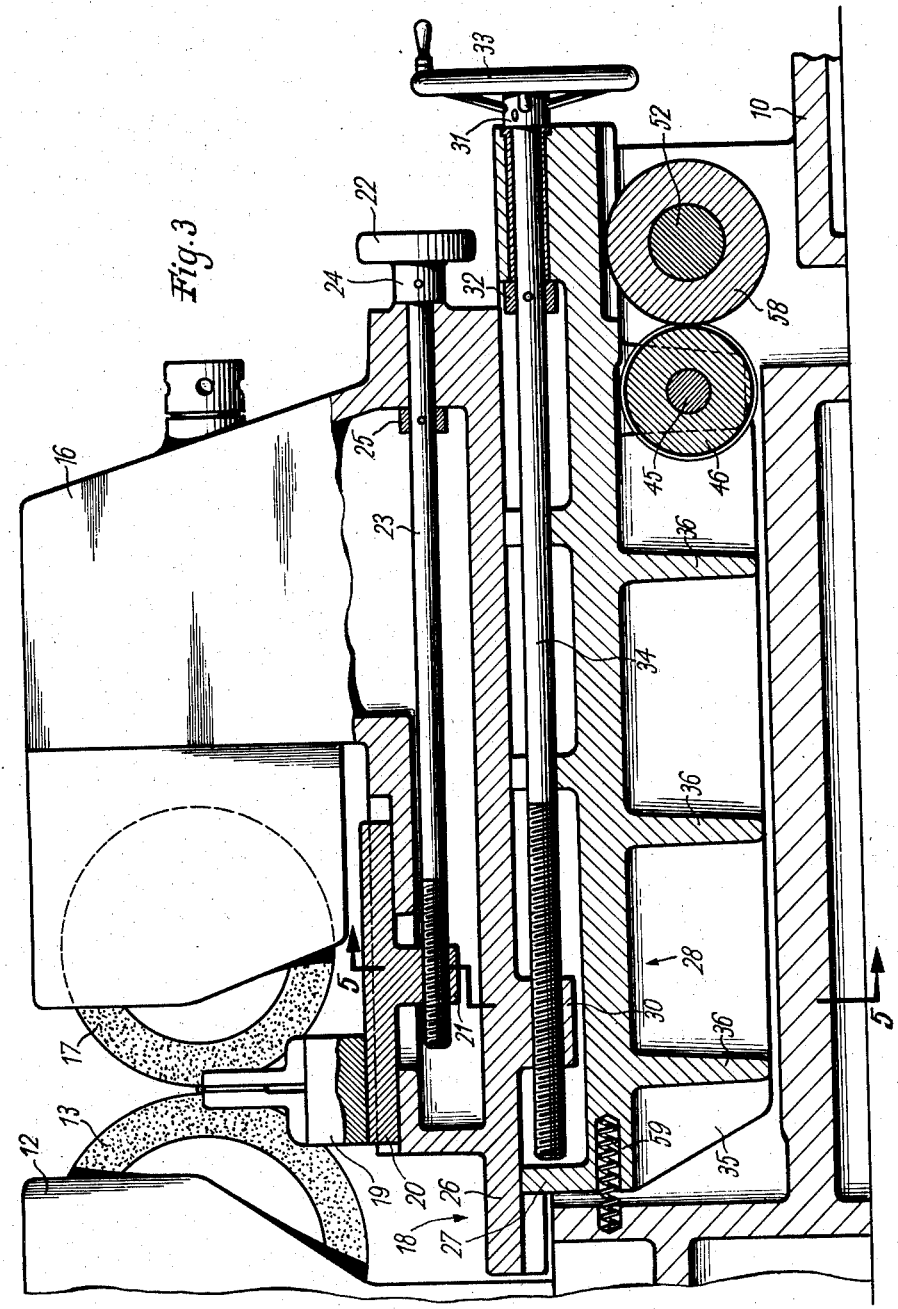
Fig. 3 is a fragmentary sectional elevational view on an enlarged scale taken along line 3—3 of Fig. 2 in the direction of the arrows.

As is shown most clearly in Fig. 3, the carriage 18 is provided with a downwardly extending nut portion 30 through which an elongated spindle 34 threadedly extends, this spindle 34 extending in a direction parallel to the path of movement of the carriage 18. The spindle 34 is rotatably supported by the fine adjustment carriage 28. As is shown at the right hand portion of Fig. 3, the carriage 28 is provided with a bearing sleeve through which the spindle 34 passes. A handle 33 is fixed to the outer end of the spindle 34, and the hub 31 of the handle 33 engages a face of the carriage 28. The spindle 34 also fixedly carries a collar 32 which engages an opposite face of the carriage 28 so that parts 31 and 32 restrain the spindle 34 against axial movement. Thus, upon rotation of the handle 33 the carriage 18 will be shifted with respect to the carriage 28, and this is the structure which produces the coarse adjustment of the grinding wheel 17.

The structure for guiding the carriage 28 for movement is shown in Figs. 1-3 and 5. The carriage 28 is provided with downwardly extending reinforcing ribs 35 and 36, the ribs 35 extending longitudinally along the carriage 28 and the ribs 36 extending transversely between the ribs 35. Furthermore, as is shown in Figs. 1 and 5, the carriage 28 is provided with a pair of laterally extending ribs 37 which also extend longitudinally along the carriage 28, and each rib 27 rotatably supports a pair of rollers 39 which are respectively turnable on shafts 38 fixed to each rib 37. These rollers 39 bear against a pair of guide strips 40 which are fixed to the support portion 11 carried by the bed 10. Thus, the rollers 39 cooperate with the rails formed by the strips 40 to prevent lateral play of the carriage 28. The side wall portions 41 of the support member 11 fixedly carry pins 42 which rotatably support rollers 43 which in turn engage guide rails 44 fixed to and extending longitudinally along the carriage 28. The rails 44 are fixed directly to the underside of the laterally extending ribs 37 of the carriage 28. Thus, there are two rollers 43 and two rollers 39 on each side of the carriage 28, and these rollers in cooperation with the rails which engage the same serve to very precisely guide the carriage 28 for movement back and forth, that is, to the right and left, as viewed in Figs. 1 and 3. As is shown in Fig. 5, screws 63 extend threadedly through the carriage 18 into engagement with strip 29 in order to releasably fix the carriages 18 and 28 to each other for movement together, as will be described below.

Figure 4:
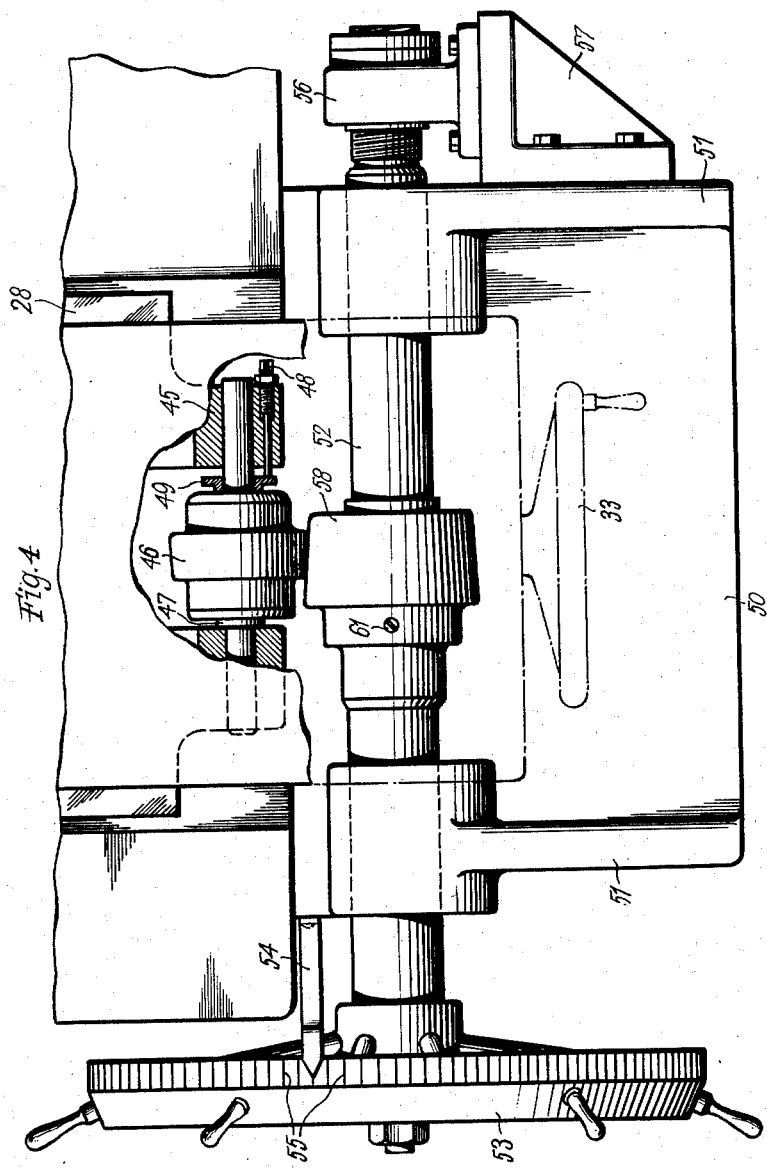
Fig. 4 is a partly broken away partly sectional top plan view on an enlarged scale of an adjusting structure in accordance with the present invention for producing a very precise fine adjustment of the machine tool.

As may be seen particularly from Fig. 4, the carriage 28 is provided adjacent its end distant from the grinding wheel 17 with a shaft 45 which extends transversely across an intermediate portion of the carriage 28. This shaft 45 is supported by suitable bored portions of the carriage 28, as is apparent from Fig. 4. The shaft 45 rotatably carries for free rotation a counter roller 46 which is in the form of a frustoconical member. A collar 47 is located between the roller 46 and one part of the carriage 28 and a washer 49 is located between the opposite part of roller 46 and another part of the carriage 28, the shaft 45 extending through the washer 49. An adjusting pin 48 is threadedly carried by a portion of the carriage 28 and extends through a bore in the carriage 28 into engagement with the washer 49 for holding the latter against the roller 46 with a sufficient pressure to allow the roller 46 to turn freely but at the same time to eliminate any play in the roller 46.

A frame portion 50 is fixed to the bed 10 and is provided with a pair of upwardly extending side wall portions 51 which are suitably bored to turnably support an adjusting screw 52 which extends across the path of movement of the carriages 18 and 28. This adjusting screw or spindle 52 is provided at its right hand end with threads which cooperate with a nut portion 56 fixedly carried by a bracket 57 which is in turn fixed to the right wall 51 of the support member 50, as viewed in Fig. 4. The left free end portion of the spindle 52 carries a handle 53 provided at its outer periphery with graduations 55 which cooperate with an index member 54 fixed to the left side wall 51 of member 50, as viewed in Fig. 4.

The spindle or screw member 52 fixedly and coaxially carries a cam in the form of a frustoconical member 58 which is fixed to the spindle 52 by a pin 61, for example. The members 46 and 58 have the same pitch, but they are directed oppositely to each other, and their outer side faces are in engagement with each other, as is apparent from Fig. 4. Thus, when the handle 53 is turned the spindle 52 by threaded engagement with a nut 56 will axially advance to the right or left, as viewed in Fig. 4, in a direction transverse to the direction of movement of the carriages, and this axial movement of the spindle 52 will cause the cam member 58 also to shift axially. The frustoconical counter roller 56 by engagement with the cam 58 will be urged in the direction of movement of the carriage 28. Thus, the structure of Fig. 4 is capable of producing a very precise fine adjustment of the carriage 28 with a relatively large angle of rotation of the handle 53. As is shown most clearly in Fig. 3, a spring 59 bears at one end against a part of the stationary support 10, 11 and at its other end extends into a bore of the carriage 28 and urges the latter to the right, as viewed in Fig. 3, so that in this way the counter roller 46 is always maintained in engagement with the adjusting cam 58.

The above described structure operates as follows:

In order to carry out a rough adjustment of the tool 17, the operator turns the handle 33 so as to advance the carriage 18 with respect to the carriage 28 until the tool 17 is roughly located in its operating position. It should be noted that during this rough adjustment of the carriage 18 the carriage 28 remains stationary with respect to the support 10, 11 because the spring 59 maintains elements 46 and 58 in engagement with each other. It should be noted that this spring 59 as well as the above described rollers 39 and 43 eliminate all play from the carriage 28. After the carriage 18 is thus roughly adjusted, the operator tightens the screws 63 in order to fixedly connect the carriages 18 and 28 to each other for movement together.

In order to carry out a subsequent fine adjustment of the tool 17, the handle 53 is turned by the operator, and in the above described manner, the elements 58 and 46 cooperate with each other to shift the fine adjustment carriage 28 until the tool 17 is very precisely located in its operating position. By proper choice of the thread of the spindle 52 as well as of the pitch of the frusto-conical members 46 and 58 and as well as of the diameter of the hand wheel 53, it is possible to provide the finest adjustment of the tool of the machine tool with a relatively large angle of movement of the handle 53. For example, it is possible without any difficulty to design the parts so that the carriage 28 can be advanced through one thousandth of a millimeter when the handle 53 is turned through a linear distance of approximately 1 centimeter. The pitch of the frustoconical members 46 and 58 can be chosen in such a way that a large number of revolutions of the hand wheel 53 is required in order to provide in the carriage 28 an advance of one millimeter. The accuracy of the adjustment provided with the above described structure is practically unlimited and with an extremely simple structure it is possible to provide an adjustment having an accuracy of one-half a micron.

It should be noted that with the above described structure wearing away of the frustoconical fine adjusting members 46 and 58 does not occur so that adjustment errors resulting from wearing away of these parts are eliminated. Since a relatively large rotation of the hand wheel 53 produces only an extremely small movement of the carriage 28 the above described structure is also practically independent of any fluctuations in temperature.

It will be understood that each of the elements described above, or two or more together, may also find a useful application in other types of machine tool differing from the types described above.

While the invention has been illustrated and described as embodied in adjusting structure for machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine comprising, in combination, a first carriage; support means supporting said first carriage for movement along a first path; a second carriage carried by said first carriage for movement with respect to said first carriage along a second path substantially parallel to said first path; adjusting means operatively connected to said second carriage for roughly adjusting the position thereof along said second path; first means carried by said support means and second means carried by said first carriage, engaging said first means and cooperating therewith for very precisely adjusting the position of said first carriage, said first means including a cam in the form of a frustoconical member and engaged by said second means; means for supporting said cam and for moving the same in a direction transverse to said first path and means for resiliently urging said second means into engagement with said cam.

2. In a machine, in combination, a carriage; support means supporting said carriage for movement along a given path; a threaded spindle extending in a direction substantially perpendicular to said path and carried for rotation about its axis by said support means; a stationary nut carried by said support means and threadedly engaging said spindle so that the latter shifts axially when turned; a cam in the form of a frustoconical member coaxially fixed to said spindle for axial and rotational movement therewith; and a frustoconical member of the same pitch as said cam directed oppositely to the same, having an outer side surface engaging the side surface of said cam and carried by said carriage for free rotation about an axis parallel to said spindle so that when the latter is turned said carriage will have its position very precisely adjusted.

3. A machine comprising, in combination, a support member; a first carriage member; roller means carried by one of said members and engaging the other of said members for guiding said first carriage member for movement without play along a first path; a second carriage member; guide means carried by one of said carriage members for guiding and engaging the other of said carriage members for guiding said second carriage member with respect to said first carriage member along a second path substantially parallel to said first path; a first adjusting screw extending in a direction substantially parallel to said paths and supported only for rotation about its axis by said first carriage member; first nut means fixed to said second carriage member and threadedly engaging said first screw so that the latter may be turned for adjusting said second carriage member with respect to said first carriage member; a second adjusting screw extending across said first path and carried for rotation about its axis by said support member; second nut means fixed to said support member and threadedly engaging said second adjusting screw so that the latter is axially moved when turned with respect to said second nut means; a frustoconical cam member coaxially fixed to said second screw for movement therewith; and a frustoconical roller directed oppositely to said cam member, having an outer side surface engaging an outer side surface of said cam member, having a pitch equal to that of said cam member, and being carried by said first carriage member for free rotation about an axis parallel to said second screw member, whereby said first screw member may be turned to effect a rough adjustment of said second carriage member and a tool carried thereby while said second screw member may be turned to effect a fine adjustment of both carriage members and the tool therewith.

4. A machine comprising, in combination, a support member; a first carriage member; roller means carried by one of said members and engaging the other of said members for guiding said first carriage member for movement without play along a first path; a second carriage member; guide means carried by one of said carriage members and engaging the other of said carriage members for guiding said second carriage member with respect to said first carriage member along a second path substantially parallel to said first path; a first adjusting screw extending in a direction substantially parallel to said paths and supported only for rotation about its axis by said first carriage member; first nut means fixed to said second carriage member and threadedly engaging said first screw so that the latter may be turned for adjusting said second carriage member with respect to said first carriage member; a second adjusting screw extending across said first path and carried for rotation about its axis, by said support member; second nut means fixed to said support member and threadedly engaging said second adjusting screw so that the latter is axially moved when turned with respect to said second nut means; a frustoconical cam member coaxially fixed to said second screw for movement therewith; a frustoconical roller directed oppositely to said cam member, having an outer side surface engaging an outer side surface of said cam member, having a pitch equal to that of said cam member, and being carried by said first carriage member for free rotation about an axis parallel to said second screw member, whereby said first screw member may be turned to effect a rough adjustment of said second carriage member and a tool carried thereby while said second screw member may be turned to effect a fine adjustment of both carriage members and the tool therewith; and spring means engaging said support member and first carriage member for resiliently urging said roller into engagement with said cam member.

5. A machine comprising, in combination, a support member; a first carriage member; roller means carried by one of said members and engaging the other of said members for guiding said first carriage member for movement without play along a first path; a second carriage member; guide means carried by one of said carriage members and engaging the other of said carriage members for guiding said second carriage member with respect to said first carriage member along a second path substantially parallel to said first path; a first adjusting screw extending in a direction substantially parallel to said paths and supported only for rotation about its axis by said first carriage member; first nut means fixed to said second carriage member and threadedly engaging said first screw so that the latter may be turned for adjusting said second carriage member with respect to said first carriage member; a second adjusting screw extending across said first path and carried for rotation about its axis by said support member; second nut means fixed to said support member and threadedly engaging said second adjusting screw so that the latter is axially moved when turned with respect to said second nut means; a frustoconical cam member coaxially fixed to said second screw for movement therewith; a frustoconical roller directed oppositely to said cam member, having an outer side surface engaging an outer side surface of said cam member, having a pitch equal to that of said cam member, and being carried by said first carriage member for free rotation about an axis parallel to said second screw member, whereby said first screw member may be turned to effect a rough adjustment of said second carriage member and a tool carried thereby while said second screw member may be turned to effect a fine adjustment of both carriage members and the tool therewith; and means for releasably fixing said carriage members to each other.

6. A machine comprising, in combination, a support member; a first carriage member; roller means carried by one of said members and engaging the other of said members for guiding said first carriage member for movement without play along a first path; a second carriage member; guide means carried by one of said carriage members and engaging the other of said carriage members for guiding said second carriage member with respect to said first carriage member along a second path substantially parallel to said first path; a first adjusting screw extending in a direction substantially parallel to said paths and supported only for rotation about its axis by said first carriage member; first nut means fixed to said second carriage member and threadedly engaging said first screw so that the latter may be turned for adjusting said second carriage member with respect to said first carriage member; a second adjusting screw extending across said first path and carried for rotation about its axis, by said support member; second nut means fixed to said support member and threadedly engaging said second adjusting screw so that the latter is axially moved when turned with respect to said second nut means; a frustoconical cam member coaxially fixed to said second screw for movement therewith; a frustoconical roller directed oppositely to said cam member, having an outer side surface engaging an outer side surface of said cam member, having a pitch equal to that of said cam member, and being carried by said first carriage member for free rotation about an axis parallel to said second screw member, whereby said first screw member may be turned to effect a rough adjustment of said second carriage member and a tool carried thereby while said second screw member may be turned to effect a fine adjustment of both carriage members and the tool therewith; spring means engaging said support member and first carriage member for resiliently urging said roller into engagement with said cam member; and means for releasably fixing said carriage members to each other.

References Cited in the file of this patent
UNITED STATES PATENTS

| | | |
|---|---|---|
| 1,864,486 | Einstein | June 21, 1932 |
| 2,024,283 | Gertiser | Dec. 17, 1935 |
| 2,045,894 | Binns | June 30, 1936 |
| 2,049,611 | Harrison et al. | Aug. 4, 1936 |
| 2,060,785 | Binns et al. | Nov. 17, 1936 |
| 2,427,024 | Scrivener | Sept. 9, 1947 |
| 2,722,162 | Berthiez | Nov. 1, 1955 |